United States Patent [19]

Terai et al.

[11] 4,002,860
[45] Jan. 11, 1977

[54] TRANSMITTING AND RECEIVING APPARATUS

[75] Inventors: Masaaki Terai; Kazuhiko Kakehi, both Tokyo; Ryoichi Matsuda, Musashino; Giichi Ito, Koganei, all of Japan

[73] Assignee: Nippon Telegraph and Telephone Public Corporation, Tokyo, Japan

[22] Filed: Apr. 2, 1975

[21] Appl. No.: 564,544

[30] Foreign Application Priority Data

Apr. 4, 1974  Japan ............................. 49-37326

[52] U.S. Cl. ..................... 179/170 R; 179/1 HF; 179/102
[51] Int. Cl.² ....................... H04B 1/52; H04B 3/36
[58] Field of Search ........... 179/1 HF, 81 B, 170 R, 179/170 D, 170 NC, 1 FS, 81 R, 102, 100 L

[56] References Cited

UNITED STATES PATENTS

| 2,282,465 | 5/1942 | Edwards | 179/170 D |
| 2,535,063 | 12/1950 | Halstead | 179/102 |
| 2,812,388 | 11/1957 | Thomas | 179/170 D |
| 3,178,648 | 4/1965 | Tanner | 179/1 HF |
| 3,778,563 | 12/1973 | Bise et al. | 179/170 D |
| 3,784,755 | 1/1974 | Cambridge et al. | 179/170 D |
| 3,889,058 | 6/1975 | Gabr | 179/1 HF |
| 3,908,095 | 9/1975 | Jinsenji | 179/102 |
| 3,946,169 | 3/1976 | Miya | 179/170 R |

Primary Examiner—Kathleen H. Claffy
Assistant Examiner—Randall P. Myers
Attorney, Agent, or Firm—Charles E. Pfund

[57] ABSTRACT

Only one reversible electro-acoustic converter is used to act without a press-to-talk switch or the like as a transmitter and a receiver. The electro-acoustic converter is connected to a communication line through two 2 – 4 converters in the form of hybrid transformers which are interconnected to form a transmitting system and a receiving system.

9 Claims, 4 Drawing Figures

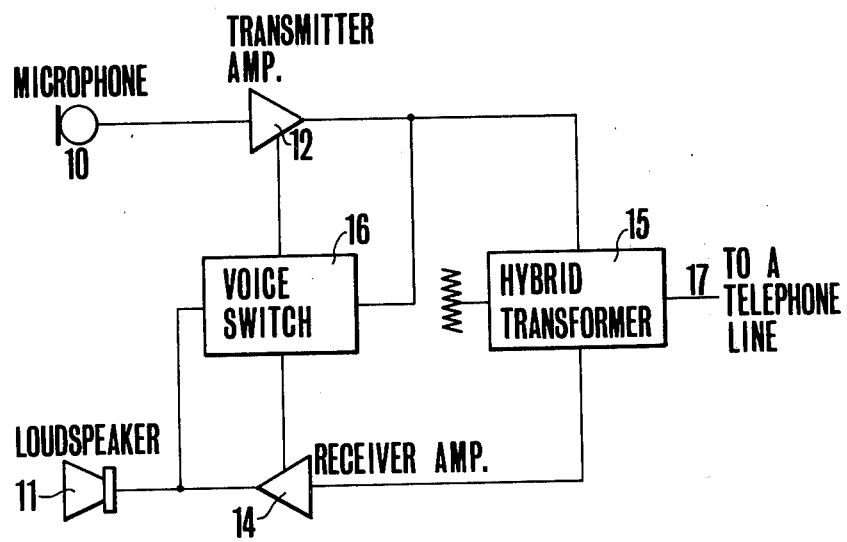
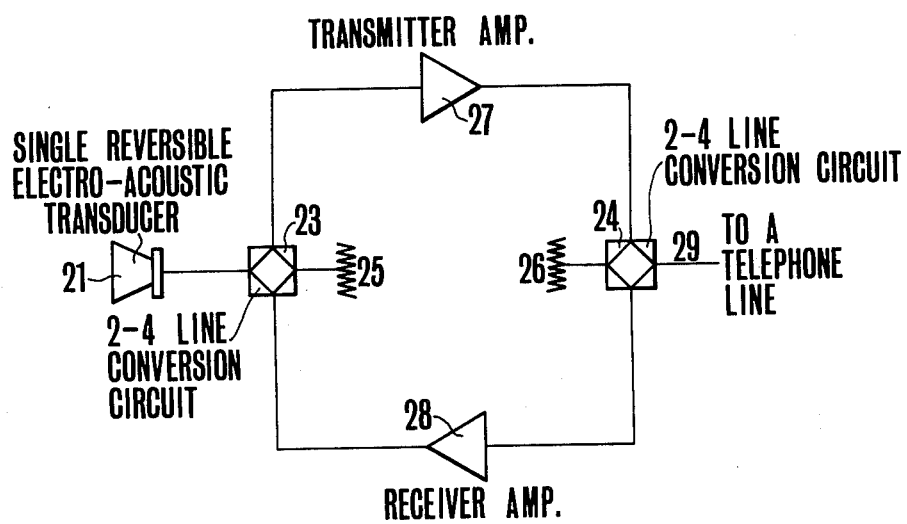

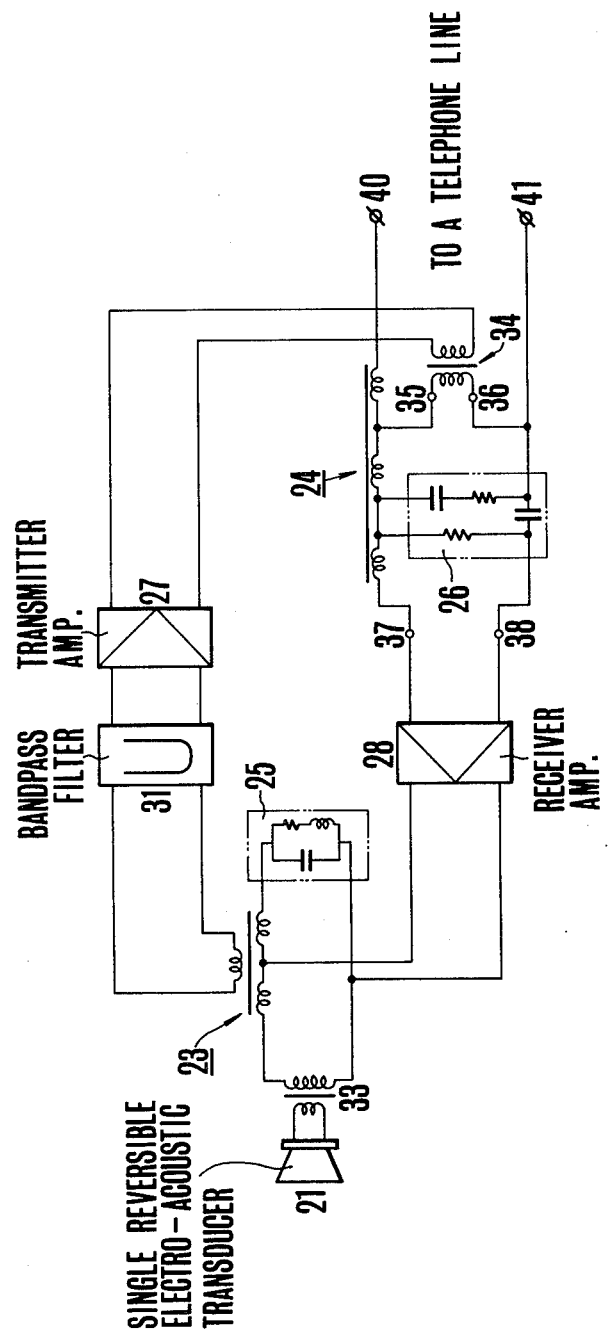

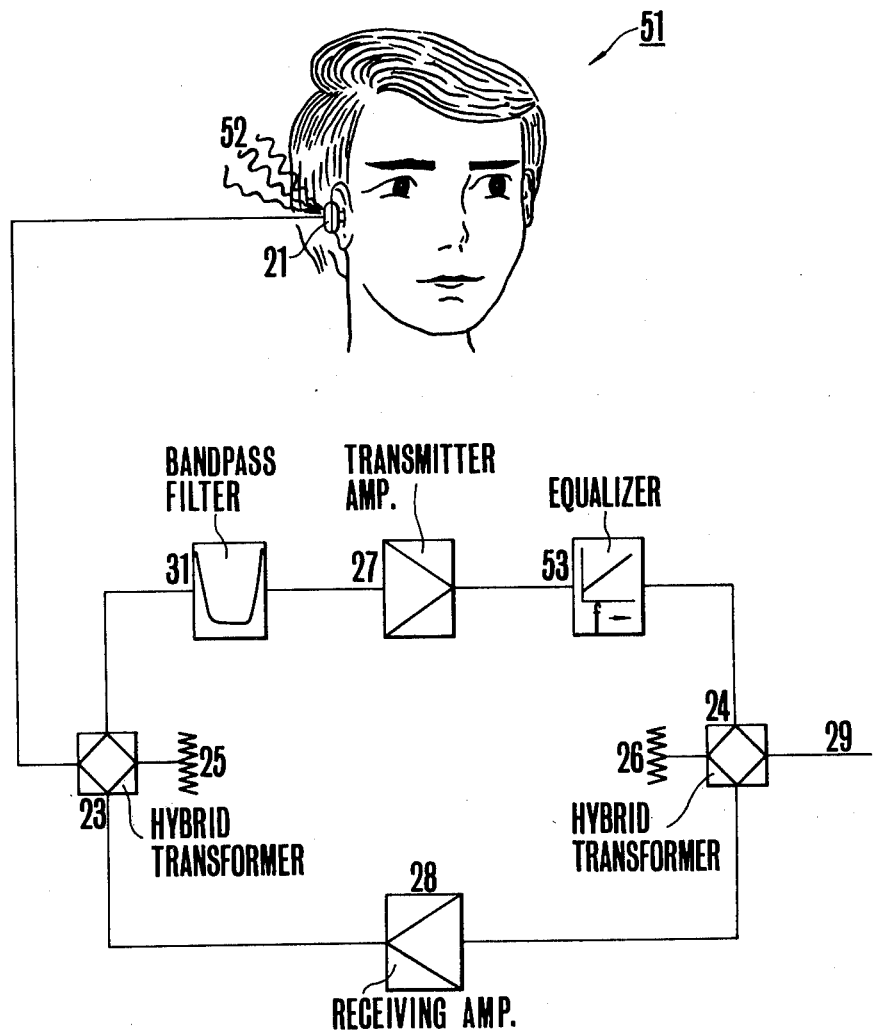

TRANSMITTING AND RECEIVING APPARATUS

BACKGROUND OF THE INVENTION

This invention relates to a transmitting and receiving apparatus, more particularly to a transmitting and receiving apparatus in which a single reversible electro-acoustic transducer is used for both transmitting and receiving purposes.

A typical prior art loudspeaker telephone set shown in FIG. 1 comprises a microphone 10, a loudspeaker 11, a transmitter amplifier 12, a receiver amplifier 14, a hybrid transformer 15 connected to a telephone line 17, and a voice switch circuit 16 which are connected as shown. However, in a loudspeaker telephone set constructed as shown in FIG. 1 as the hybrid transformer 15 cannot provide a perfect sidetone balance for various impedances of the telephone line, the transmitted voice current flows through a closed loop circuit including microphone 10, transmitter amplifier 12, hybrid transformer 15, receiving amplifier 14, loudspeaker 11 and microphone 10 so that a howling is created thereby making impossible the conversation.

For this reason, in the design of a prior art loudspeaker telephone set, for the purpose of decreasing the acoustic coupling between the loudspeaker and the microphone, it has been necessary to take into consideration such various factors as the directional characteristics of the loudspeaker and the microphone, the anti-howling effect between the loudspeaker and the microphone, and the acoustic characteristics of a room in which the telephone set is installed. These factors cause difficult problems especially when the loudspeaker and the microphone are contained in the same casing. In recent loudspeaker telephone sets, for the purpose of preventing howling, it has been proposed to provide a voice switch circuit 16 which functions to lower the gain of the receiver amplifier during transmission and to lower the gain of the transmitter amplifier during reception. However, although this measure can prevent the occurence of howling there is a tendency of losing the leading and trailing ends of the voice thereby greaty degrading the quality of the speech.

SUMMARY OF THE INVENTION

It is an object of this invention to provide improved transimitting and receiving apparatus capable of preventing the occurence of howling thereby improving the quality of the speech.

Another object of this invention is to provide an improved transimitting and receiving apparatus of a simplified construction in which only a single reversible electro-acoustic converter is used to act as a transmitter and a receiver.

Still another object of this invention is to provide a novel transmitting and receiving apparatus in which, when designing the telephone circuit, it is not necessary to take into consideration such factors as the acoustic characteristics of the room in which the transmitting and receiving apparatus is installed, anti-vibration characteristic of the casing and the acoustic coupling between the transmitter and the receiver.

A further object of the invention is to provide an improved transmitting and receiving apparatus wherein the howling margin of the system is broadened as the conversion efficiency of the electro-acoustic converter is improved.

Still further object of this invention is to provide a novel transmitting and receiving apparatus which does not require the use of a voice switch thereby improving the quality of the communication.

Yet another object of this invention is to provide an improved transmitting and receiving apparatus which requires a small number of component parts and hence can be fabricated as a small and light weight set.

Still another object of this invention is to provide a new type of telephone set which does not require holding a handset or using a headset provided with a microphone.

According to this invention, these and further objects can be accomplished by providing transmitting and receiving apparatus, characterized in that it comprises a single reversible electro-acoustic converter acting as a transmitter and receiver, and first and second 2-wire to 4-wire converters, that the 2-wire side terminal pair of the first 2-wire to 4-wire converter is connected to the reversible electro-acoustic converter, that the first terminal pair of the 4-wire side terminal pairs of the first 2-wire to 4-wire converter is connected to the first terminal pair of the 4-wire side terminal pairs of the second 2-wire to 4-wire converter through an amplifier for constituting a transmitting system, that the second terminal pair of the 4-wire side terminal pairs of the first 2-wire to 4-wire converter is connected to the second terminal pair of the 4-wire side terminal pairs of the second 2-wire to 4-wire line converter for constituting a receiving system, and that the two wire side terminal pair of the second 2-wire to 4-wire converter is connected to a communication.

BRIEF DESCRIPTION OF THE DRAWINGS

In the accompanying drawings:

FIG. 1 is a simplified connection diagram of a prior art loudspeaker telephone set;

FIG. 2 is a basic connection diagram for explaining the principle of the novel transmitting and receiving apparatus embodying of the invention;

FIG. 3 is a connection diagram showing a preferred embodiment of this invention, and FIG. 4 is a block diagram showing another embodiment of this invention.

DESCRIPTION OF THE PREFERRED EMBODIMENTS

As diagrammatically shown in FIG. 2, the novel transmitting and receiving apparatus of this invention applied to a telephone set comprises a single reversible electro-acoustic transducer 21 having the functions of both transmitter and receiver first and second 2-wire to 4-wire conversion circuits (hereafter called a transducer side hybrid transformer and a line side hybrid transformer, respectively) 23 and 24, balancing circuit networks 25 and 26 for the transducer side hybrid transformer 23 and the line side hybrid transformer 24, respectively, a transmitter amplifier 27 and a receiver amplifier 28.

In the telephone circuit shown in FIG. 2, the transducer side hybrid transformer 23 operates to transmit signals from the transducer 21 to the transmitter amplifier 27 and from the receiving amplifier 28 to the transducer 21. However, by making the impedance $Z_{ns}$ of the balancing circuit network 25 to be equal to the impedance $Z_s$ of the transducer 21 it is possible to suppress the transmission of the signals from the receiver amplifier 28 to the transmitter amplifier 27.

Since the value of the impedance $Z_s$ of the transducer 21 is known and independent of such external conditions as a telephone line 29 it is possible to make the impedance $Z_s$ of the transducer 21 equal $Z_{ns}$ the impedance of the balancing circuit network 25 over the entire transmission frequency band so that it is possible to suppress the transmission of the signals from the receiver amplifier 28 to the transmitter amplifier 27. For example, commercial dynamic type loudspeakers have impedance values $Z_s$ of 8 ohms or 16 ohms so that balancing circuit networks having these impedance values are used. The line side hybrid transformer 24 functions to transmit signals from the transmitter amplifier 27 to the telephone line 29 and from the telephone line 29 to the receiver amplifier 28. However, by making the impedance $Z_{ns}$ of the balancing circuit network equal to impedance $Z_L$ of the telephone line 29 it is possible to suppress the transmission of signals from the transmitter amplifier 27 to the receiver amplifier 28. However, as the frequency characteristic of the impedance $Z_L$ of the telephone line is not only extremely complicated but also varies greatly dependent upon the length and type of the telephone line, it is difficult to make impedances $Z_{ns}$ and $Z_L$ equal over the entire transmission frequency band. For this reason, it is impossible to perfectly suppress the transmission of signals from the transmitter amplifier 27 to the receiver amplifier 28. Even when the impedances $Z_{ns}$ and $Z_L$ are not equal, the object of this invention can be accomplished, as will be described later in detail.

The telephone circuit shown in FIG. 2 operates as follows. The transmitting voice is transformed into an electrical signal by means of the transducer 21 which functions as the transmitter and receiver and the electric signal is supplied to the transmitter amplifier 27 via the transducer side hybrid transformer 23. The signal is amplified to have a proper lever by the transmitter amplifier 27 and is then transmitted over the telephone line 29 through the line side hybrid transformer 24. As the line side hybrid transformer 24 is not perfectly balanced for side tones a portion of the transmitted signal is transmitted to the receiver amplifier 28. However, because the transducer side hybrid transformer 23 is well balanced this signal will not be transmitted to the receiver amplifier 27 but transmitted to the transducer 21 through the hybrid transformer 23. This signal has the same nature as the side tone in a conventional loudspeaker telephone set. However, according to this invention since the transducer 21 acts as a transmitter and a receiver there is not appreciable acoustic coupling. Accordingly, the signal will not be transmitted to the transmitter amplifier again through the transducer side hybrid transformer 23.

For this reason, no howling occurs in a loop including transmitter amplifier 27, hybrid transformer 24, receiver amplifier 28, hybrid transformer 23 and transmitter amplifier 27, or in a loop including transducer 21, transmitter amplifier 27, hybrid transformer 24, receiver amplifier 28, hybrid transformer 23 and transducer 21.

The signal received from the telephone line 29 enters into the receiver amplifier 28 through line side hybrid transformer 24 and is amplified to have a suitable level. The output of the receiver amplifier 28 is applied to the transducer 21 through the transducer side hybrid transformer 23 to be transformed into an acoustic replica of a voice. However, as described hereinabove, the received voice signal and the reproduced voice are not transmitted again to the transmitter amplifier 27.

The construction and operation of the circuit shown in FIG. 2 will now be described in detail with reference to FIG. 3, in which the components corresponding to those shown in FIG. 2 are designated by the same reference numerals. In addition to the components already described in connection with FIG. 2, the circuit shown in FIG. 3 comprises a bandpass filter 31 in series with the transmitter amplifier 27, transformers 33 and 34, input terminals 35 and 36 of the line side hybrid transformer 24 for applying received signals and output terminals 37 and 38 of the line side hybrid transformer 24 for deriving out the received signal. Where the hybrid transformer 23 is matched by means of the balancing network as shown in FIG. 2, the range of matching of the bandpass filter 31 may be within the range of from 0.3 to 4 KHz, and any other frequency band is not necessary. The purpose of the bandpass filter 31 is thus to prevent howling, caused by the frequencies in said other frequency band.

In the circuit shown in FIG. 3, the transducer side hybrid transformer 23 takes the form of a bridge type hybrid transformer, and a type 600 telephone circuit now being widely used is used as the line side hybrid transformer 24 and the balancing circuit 26. However, a dial and a magneto bell are not shown. A usual dynamic loudspeaker is used as the transducer 21 which is connected to the bridge type hybrid transformer 23 through transformer 33 for providing an impedance matching. By using such dynamic type loudspeaker, it is possible to constitute the balancing circuit network 25 with a capacitor, a resistor and an inductor making it possible to provide a complete balance over the entire transmitting frequency band.

The output terminal of the transmitter amplifier 27 is coupled to the transmission terminals of the type 600 telephone circuit through transformer 34, the secondary resistance thereof acting as a carbon transmitter for forming a DC loop to a telephone exchange, not shown. The bandpass filter 31 is connected in series with the transmitter amplifier 27 for cutting off the frequency other than those in the transmission band width thus improving the characteristics of the transducer side hybrid transformer 23. In this manner, a telephone set having improved characteristics for bidirectional transmission is provided.

As described above the telephone set shown in FIG. 3 comprises a single reversible electro-acoustic transducer acting as a transmitter and a receiver, and first and second 2-wire to 4-wire converting circuits. The two wire side terminals of the first 2-wire to 4-wire converter circuit are connected to the reversible electro-acoustic transducer and the 4-wire side terminal pairs are connected to the 4-wire side terminal pairs of the second 2-wire to 4-wire converting circuit respectively through amplifiers. A pair of terminals 40 and 41 of the second converting circuit are connected across the telephone line.

FIG. 4 shows another embodiment of this invention as applied to an ear plug type hand free telephone set in which components corresponding to those shown in FIG. 3 are designated by the same reference numerals. A user, generally designated 51 is shown in an environment of noise 52. The output of the transmitter amplifier 27 is applied to an equalizer 53 comprising a frequency characteristic compensating circuit for compensating for the frequency characteristic of the transmitted signal. The user 51 utilizes an ear plug type small transducer 21 which responds to the sound pressure created in the ear when the user speaks, and/or vibrations transmitted through bones or the sound pressure created in the atmosphere when the user speaks thus operating as a transmitter which produces a signal voltage corresponding to the voice to be transmitted. This signal voltage is applied to the transmitter amplifier 27 through hybrid transformer 23 and bandpass filter 31. The amplified output from the transmitter 27 is sent out to the telephone line 29 via equalizer 53 and hybrid transformer 24. When the transducer 21 operates in response to the vibrations transmitting through the bones and the sound pressure created in the ear, the level of the signal is attenuated across the frequency band. The purpose of equalizer 53 is to compensate for such attenuation. Such equalizers are well known.

The signal received from the telephone line 29 is applied to the receiver amplifier 28 via the hybrid transformer 25, and substantially all of the signal energy of the amplified output of the amplifier 28 is transmitted to the transducer 21 via hybrid transformer 23. Where the telephone circuit is connected to an ordinary telephone system the receiver amplifier 28 may be omitted if the received signal has a sufficiently high level. With the embodiment shown in FIG. 4 it is possible to communicate without holding a handset or using a headset provided with a microphone. Especially when the transducer 21 is constructed such that it can sense only the signals transmitted through bones or the sound pressure in the ear at the time of transmission, it is possible to prevent room noise 52 or other external noises from degrading the S/N ratio of the received signal by flowing through a circuit including hybrid transformer 23, bandpass filter 31, transmitter amplifier 27, equalizer 53, hybrid transformer 24, receiver amplifier 28, hybrid transformer 23 and transducer 21, thereby improving the quality of the communication. When the telephone set of this embodiment is applied to a headset used by a telephone operator it is not necessary to dispose a microphone in front of the mouth of the operator thus providing a headset which is extremely easy to operate.

Although the invention has been described as applied to a loudspeaker telephone set having excellent bidirectional communication ability and to an ear plug type hand free telephone set utilizing a combinded transmitter-receiver it should be understood that the invention is not limited to these specific embodiments. Further, the hybrid transformer utilized in the 2-wire to 4-wire converting circuits may be substituted by an active circuit.

This invention has the following advantages when compared with the prior art telephone set.

1. Only a single electro-acoustic transducer is sufficient to act as a microphone and a speaker.

2. When designing the circuit, it is not necessary to consider such factors as the acoustic characteristic of the room, anti-vibration characteristic of the casing, and the acoustic coupling between the transmitter and receiver.

3. The efficiency of conversion of the electro-acoustic transducer is improved. Accordingly the howling margin of the system is broadened. Moreover, as the voice switch is not necessary it is possible to improve the quality of the communication.

4. The number of the component elements is small so that it is possible to decrease the size, weight and cost of the telephone set. Accordingly, the invention is suitable for use in loudspeaker telephone sets, ear plug type hand-free telephone sets, telephone sets used in local offices such as intercoms, etc. Thus, the invention can readily be applied to an intercom system by merely substituting a talking line for the telephone line shown in FIG. 2.

What is claimed is:

1. Transmitting and receiving apparatus comprising a single reversible electro-acoustic converter acting as a transmitter and a receiver, and first and second 2-wire to 4-wire converters, the 2-wire side terminal pair of said first 2-wire to 4-wire converter being connected to said reversible electro-acoustic converter, the first terminal pair of the 4-wire side terminal pairs of said first 2-wire to 4-wire converter being connected to the first terminal of the 4-wire side terminal pairs of said second 2-wire to 4-wire converter through an amplifier for constituting a transmitting system, the second terminal pair of said 4-wire side terminal pairs of said first 2-wire to 4-wire converter being connected to the second terminal pair of the 4-wire side terminal pairs of said second 2-wire to 4-wire converter for constituting a receiving system, and the 2-wire side terminal pair of said second 2-wire to 4-wire converter being connected to a communication line.

2. The transmitting and receiving apparatus according to claim 1 wherein an amplifier is connected in a receiving system extending between the two terminal pair of the 4-wire side terminal pairs of the second 2-wire to 4-wire converter, and the terminal pair of the 4-wire side terminal pairs of said first 2-wire to 4-wire converter.

3. The transmitting and receiving apparatus according to claim 1 wherein an equalizer for compensating for the frequency characteristic of the transmitted signal is connected between the amplifier in the transmitting system and said first terminal pair of the 4 side terminal pairs of said second 2-wire to 4-wire converter.

4. The transmitting and receiving apparatus according to claim 1 wherein each 2-wire to 4-wire converter comprises a hybrid transformer, and said first 2-wire to 4-wire converter is connected to a balancing circuit network having an impedance equal to that of said reversible electro-acoustic converter.

5. The transmitting and receiving apparatus according to claim 4 wherein said second 2-wire to 4-wire converter is connected to a balancing circuit network having an impedance whose value has been set to match with the impedance of a communication line.

6. The transmitting and receiving apparatus according to claim 5 wherein said communication line comprises a telephone line.

7. The transmitting and receiving apparatus according to claim 1 wherein a bandpass filter passing only the voice frequencies is connected between said amplifier in the transmitting system and the first terminal pair of the 4 line terminal side of said first 2-wire to 4-wire converter.

8. The transmitting and receiving apparatus according to claim 1 wherein said first 2-wire to 4-wire converter comprises a bridge type hybrid transformer.

9. The transmitting and receiving apparatus according to claim 1 wherein said reversible electro-acoustic converter comprises a ear plug type converter.

* * * * *

UNITED STATES PATENT AND TRADEMARK OFFICE
CERTIFICATE OF CORRECTION

PATENT NO. : 4,002,860
DATED : January 11, 1977
INVENTOR(S) : Masaaki Terai; Kazuhiko Kakehi; Ryoichi Matsuda and Giichi Ito It is certified that error appears in the above-identified patent and that said Letters Patent are hereby corrected as shown below:

Col. 1, line 44, change "greaty" to ---greatly---.

Col. 2, line 32, insert ---line--- after "communication".
Col. 2, line 40, delete "of".

Col. 5, line 10, insert ---amplifier--- after "transmitter".
Col. 5, line 49, change "combinded" to ---combined---.

Signed and Sealed this

Twentieth Day of March 1979

[SEAL]

Attest:

RUTH C. MASON
Attesting Officer

DONALD W. BANNER
Commissioner of Patents and Trademarks